US009470806B2

(12) United States Patent
Fernihough

(10) Patent No.: US 9,470,806 B2
(45) Date of Patent: Oct. 18, 2016

(54) PIEZOELECTRIC ACCELEROMETER

(71) Applicant: PGS Geophysical AS, Oslo (NO)

(72) Inventor: Robert Alexis Peregrin Fernihough, Manor, TX (US)

(73) Assignee: PGS Geophysical AS, Oslo (NO)

( * ) Notice: Subject to any disclaimer, the term of this patent is extended or adjusted under 35 U.S.C. 154(b) by 381 days.

(21) Appl. No.: 14/145,093

(22) Filed: Dec. 31, 2013

(65) Prior Publication Data

US 2015/0063062 A1     Mar. 5, 2015

Related U.S. Application Data

(60) Provisional application No. 61/871,482, filed on Aug. 29, 2013.

(51) Int. Cl.
| | | |
|---|---|---|
| *G01V 1/00* | (2006.01) | |
| *G01V 1/16* | (2006.01) | |
| *G01H 11/08* | (2006.01) | |
| *G01P 15/09* | (2006.01) | |
| *G01V 1/38* | (2006.01) | |

(52) U.S. Cl.
CPC .............. *G01V 1/162* (2013.01); *G01H 11/08* (2013.01); *G01P 15/09* (2013.01); *G01P 15/0922* (2013.01); *G01V 1/38* (2013.01)

(58) Field of Classification Search
CPC .. G01P 15/09; G01P 15/0922; G01P 15/097; G01P 15/0802
See application file for complete search history.

(56) References Cited

U.S. PATENT DOCUMENTS

| | | | | |
|---|---|---|---|---|
| 4,333,029 A | * | 6/1982 | Kolm | G01V 1/181 310/329 |
| 4,431,935 A | | 2/1984 | Rider | |
| 5,539,270 A | * | 7/1996 | Kaji | G01P 1/023 310/329 |

(Continued)

FOREIGN PATENT DOCUMENTS

| | | |
|---|---|---|
| DE | 4135369 A1 | 5/1993 |
| EP | 0675365 A2 | 10/1995 |

(Continued)

OTHER PUBLICATIONS

European Extended Search Report mailed on Jan. 9, 2015, in the prosecution of patent application No. 14182330.2, 8 pages.

(Continued)

*Primary Examiner* — Luke Ratcliffe
*Assistant Examiner* — Hovhannes Baghdasaryan

(57) ABSTRACT

An accelerometer. At least some of the example embodiments include an accelerometer having a first piezoelectric element having a first polarization, the first piezoelectric element defining an upper surface and a second piezoelectric element having a second polarization, the second piezoelectric element defines a lower surface parallel to the upper surface of the first piezoelectric element; the first polarization being aligned with the second polarization. The accelerometer further includes a first mounting plate that defines a first aperture, the first and second piezoelectric elements extending through the first aperture such that the first mounting plate transects the first and second piezoelectric elements. The piezoelectric elements define a first cantilever portion on a first side of the first mounting plate, and the piezoelectric elements define a second cantilever portion on a second side of the first mounting plate opposite the first side.

14 Claims, 10 Drawing Sheets

(56) References Cited

U.S. PATENT DOCUMENTS

| | | | |
|---|---|---|---|
| 6,111,338 A * | 8/2000 | Otsuchi | G01P 15/0922 310/344 |
| 6,314,056 B1 | 11/2001 | Bunn et al. | |
| 6,336,365 B1 | 1/2002 | Blackadar et al. | |
| 7,737,607 B2 * | 6/2010 | Ide | H01L 41/0475 310/325 |
| 7,881,158 B2 | 2/2011 | Tenghamn | |
| 8,427,901 B2 | 4/2013 | Lunde et al. | |
| 8,446,798 B2 | 5/2013 | Tenghamn | |
| 2002/0178817 A1 * | 12/2002 | Selvakumar | G01P 15/0802 73/514.32 |
| 2008/0074946 A1 * | 3/2008 | Hillesund | G01V 1/201 367/15 |
| 2008/0108869 A1 * | 5/2008 | Sanders | A61B 1/00105 600/109 |
| 2010/0242604 A1 * | 9/2010 | Sammoura | G01C 19/5642 73/514.34 |
| 2011/0310698 A1 | 12/2011 | Maples et al. | |
| 2012/0269033 A1 | 10/2012 | Maples et al. | |
| 2013/0039149 A1 | 2/2013 | Tenghamn et al. | |
| 2013/0044565 A1 | 2/2013 | Barr et al. | |
| 2013/0064038 A1 | 3/2013 | Maples et al. | |

FOREIGN PATENT DOCUMENTS

| | | |
|---|---|---|
| EP | 08629873 A1 | 12/1998 |
| GB | 1435125 A | 5/1976 |

OTHER PUBLICATIONS

APC International, Ltd., Physical and Piezoelectric Properties of APC Materials, Nov. 13, 2013.

Loctite, Technical Data Sheet, Hysol(r) Product E-30CL, Aug. 2001.

* cited by examiner

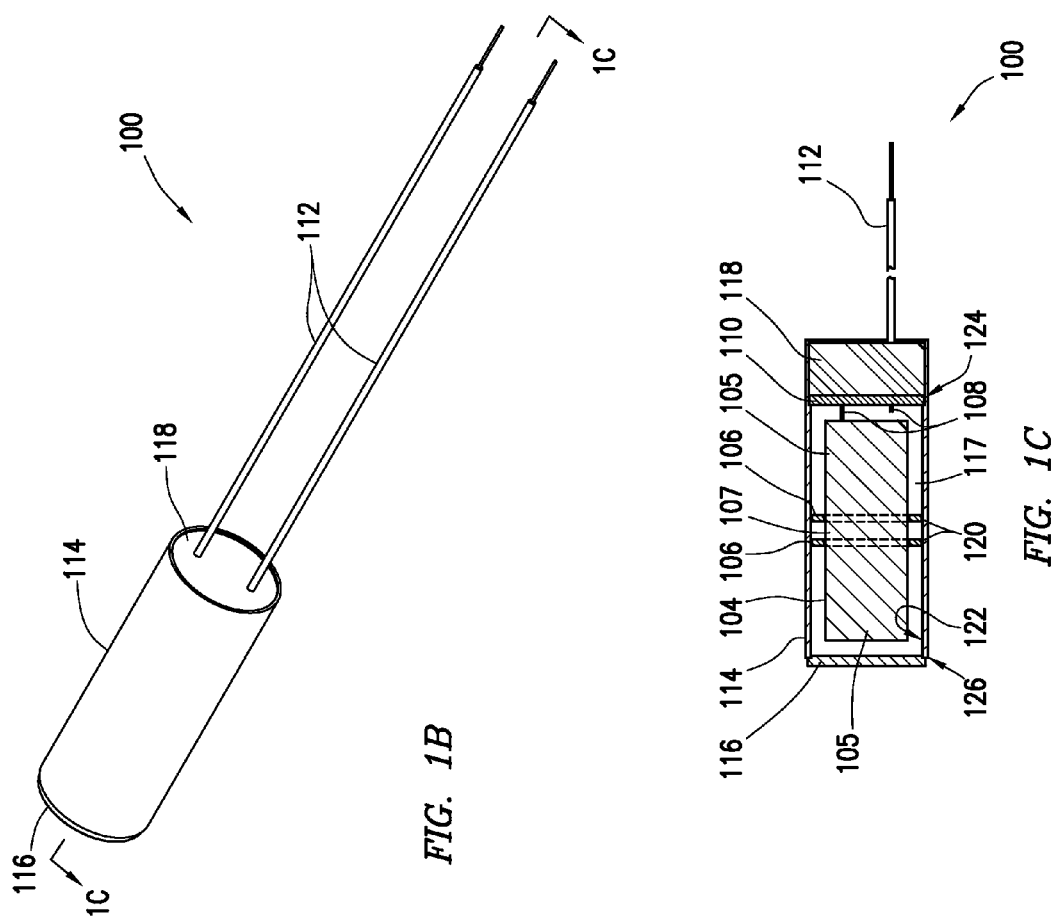

PIEZOELECTRIC ACCELEROMETER

CROSS-REFERENCE TO RELATED APPLICATIONS

This application claims the benefit of U.S. Provisional Application Ser. No. 61/871,482 filed Aug. 29, 2013 and titled "Piezoelectric Accelerometer", which provisional application is incorporated by reference herein as if reproduced in full below.

BACKGROUND

Geophysical surveying (e.g., seismic, electromagnetic) is a technique where two- or three-dimensional "pictures" of the state of an underground formation are taken. Geophysical surveying takes place not only on land, but also in marine environments (e.g., ocean, large lakes). Marine geophysical survey systems use a plurality of sensor streamers (long cables), which contain one or more sensors to detect acoustic energy emitted by one or more sources and reflected from the underground formation. Detection and interpretation of the signals represented thereby can be attenuated by destructive interference with reflections of the energy from interfaces present in the marine environment, particularly the water-air interface at the surface.

Discrimination against reflected signals may be provided by combining signals from multiple detector types sensitive to different physical characteristics of the acoustic signal. For example, when appropriately combined, the output from hydrophones sensitive to the pressure perturbation from the acoustic signal may be used in conjunction with the output of a detector sensitive to the velocity of a fluid particle for example, a geophone, may provide such discrimination. However, these detectors, particularly the geophone, typically are complex and concomitantly, costly to manufacture. Thus a low-cost device which may be used to provide similar capabilities would provide a competitive advantage in the marketplace.

BRIEF DESCRIPTION OF THE DRAWINGS

For a detailed description of exemplary embodiments, reference will now be made to the accompanying drawings in which:

FIG. 1B shows, in a perspective view an accelerometer in accordance with at least some embodiments;

FIG. 1C shows, in a top section view an accelerometer in accordance with at least some embodiments;

NOTATION AND NOMENCLATURE

Figure 1A:
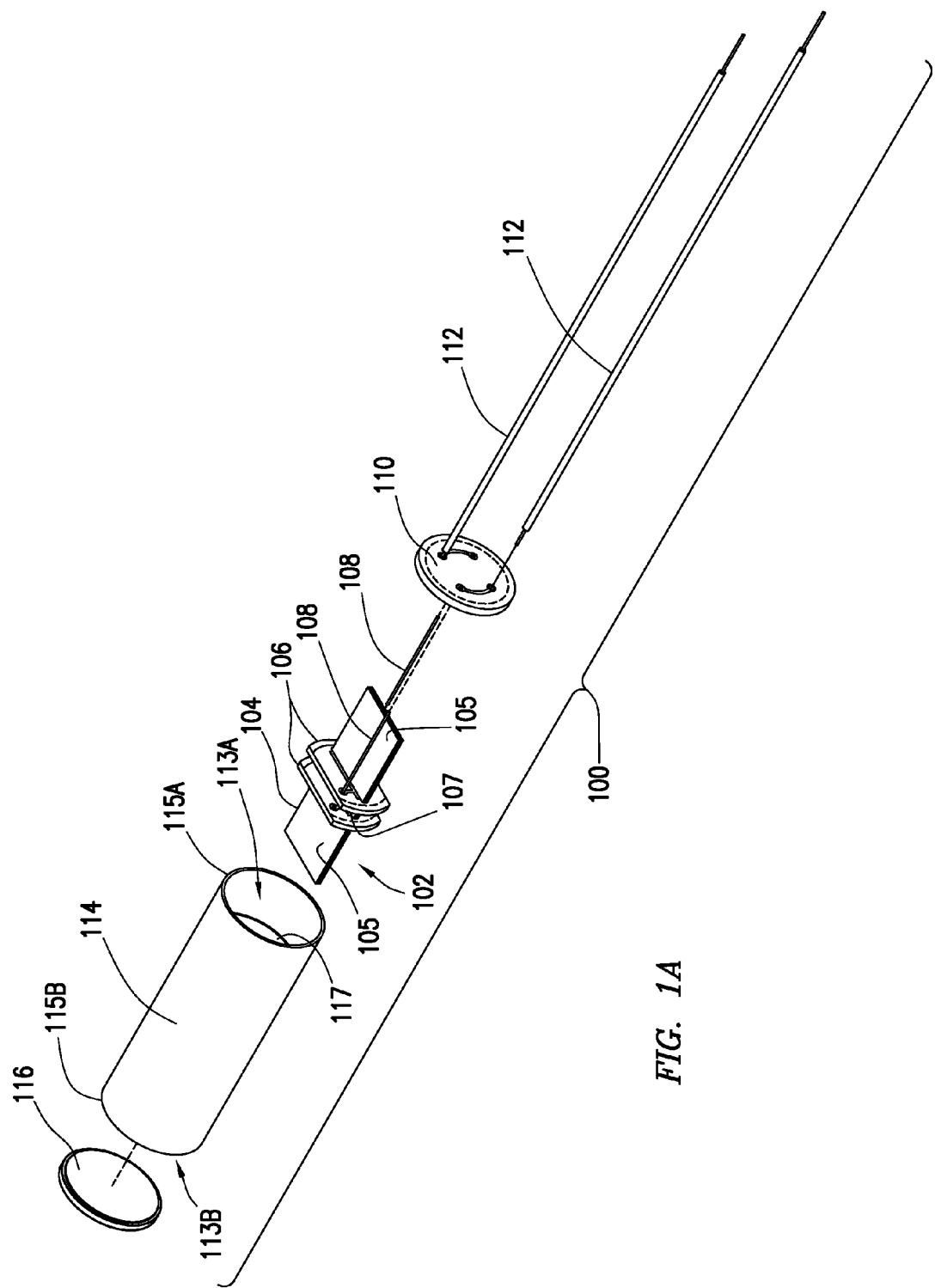
FIG. 1A shows, in an exploded view, an accelerometer in accordance with at least some embodiments.

Certain terms are used throughout the following description and claims to refer to particular system components. As one skilled in the art will appreciate, different companies may refer to a component by different names. This document does not intend to distinguish between components that differ in name but not function. In the following discussion and in the claims, the terms "including" and "comprising" are used in an open-ended fashion, and thus should be interpreted to mean "including, but not limited to . . . ." Also, the term "couple" or "couples" is intended to mean either an indirect or direct connection. Thus, if a first device couples to a second device, that connection may be through a direct connection or through an indirect connection via other devices and connections.

"Cable" shall mean a flexible, load carrying member that also comprises electrical conductors and/or optical conductors for carrying power and/or signals between components.

"Marine environment" shall mean an underwater location regardless of the salinity of the water. Thus, even an underwater location in a body of fresh water shall be considered a marine environment.

"Fluid particle" shall mean a small amount of fluid which may be identifiable while moving with a fluid flow; a fluid particle may also be referred to as a fluid element. In some embodiments, "fluid particle" may be specifically interpreted to mean any fluid parcel that is smaller than about one-tenth wavelength of sound in a medium in any direction, and, for example, in at least some embodiments may be less than 0.75 m in any direction.

"Transect" shall mean to subdivide or partition into separately identifiable portions, but not necessarily into physically disjoint portions.

"Exemplary," as used herein, means serving as an example, instance, or illustration." An embodiment described herein as "exemplary" is not necessarily to be construed as preferred or advantageous over other embodiments.

The terms "upper" and "lower" shall be considered relative locational terms in view of the local force of gravity and a particular orientation of a device, but shall not be read to require a particular operational orientation of the device.

DETAILED DESCRIPTION

The following discussion is directed to various embodiments of the invention. Although one or more of these embodiments may be preferred, the embodiments disclosed should not be interpreted, or otherwise used, as limiting the scope of the disclosure or the claims. In addition, one skilled in the art will understand that the following description has broad application, and the discussion of any embodiment is meant only to be exemplary of that embodiment, and not intended to intimate that the scope of the disclosure or the claims, is limited to that embodiment.

The various embodiments are directed to an accelerometer which may be used to detect fluid particle accelerations and thereby, by integration, fluid particle velocities in conjunction with marine geophysical survey systems. Although the developmental context may be marine geophysical survey, embodiments of the accelerometer in accordance with the principles disclosed herein are of general applicability and may be used in other applications where a determination of an acceleration of a body is desired. When used in the context of a marine geophysical survey, measurements of fluid particle velocity can be used to predict properties of formations below a body of water. In particular, measurements of fluid particle velocity may assist in identifying the location of hydrocarbon-bearing reservoirs in the formations.

FIGS. 1A and 1B show perspective views of an accelerometer 100 in accordance with at least some embodiments. Turning first to FIG. 1A, an exploded perspective view of an accelerometer 100 is shown. Accelerometer 100 includes a sensor 102. In at least some embodiments, sensor 102 comprises a piezoelectric sensing element 104 disposed within mounting plates 106. Together, piezoelectric sensing element 104 and mounting plates 106 comprise a centrally supported beam. Mounting plates 106 transect piezoelectric sensing element 104 into two cantilever portions 105 and a central portion 107 disposed between mounting plates 106. Mounting plates 106 abut an interior wall of housing 114. The embodiment of accelerometer 100 shown in FIG. 1A includes a pair of mounting plates 106, however alternative embodiments may employ a single mounting plate 106. In such embodiments, a single mounting plate may transect piezoelectric sensing element 104 into two cantilever portions without a central portion. Piezoelectric sensing element 104 will be described in further detail in conjunction with FIG. 3. As described further below in conjunction with FIGS. 3 and 7, the centrally supported beam architecture of the piezoelectric sensing element 104 and mounting plates 106 form a spring-mass system which may be responsive to accelerations of accelerometer 100.

Mounting plates 106 may also be configured to provide electrical coupling of signals generated by piezoelectric sensing element 104 to external circuitry (not shown in FIG. 1) via wires 108. In an embodiment, mounting plates 106 may be formed from printed circuit board material. An embodiment of a plate that may be used in conjunction with accelerometer 100 will be described in further detail in conjunction with FIG. 4. Wires 108 may, in some embodiments, be bare conductors, and in alternative embodiments may comprise insulated conductors. Wires 108 may couple to external circuitry via end plate 110 and external wires 112. External wires 112 may be comprised of insulated conductors. However, it would be understood by those skilled in the art that in at least some embodiments in which other mechanisms to avoid the shorting of external wires 112 are provided, wires 112 may be comprised of bare conductors.

Piezoelectric sensing element 104 may be disposed within housing 114. Housing 114 may comprise a circular cylinder forming openings 113A, 113B in corresponding ends 115A, 115B. Housing 114 further defines an internal volume 117 (partially obscured in FIG. 1A) for receiving piezoelectric sensing element 104. Piezoelectric sensing element 104 may be received in internal volume 117 via opening 113A.

Housing 114 may be any suitable material sufficient to protect piezoelectric sensing element 104 from damage when accelerometer 100 is deployed. Housing 114 may, for example, be comprised of a metal shell formed from materials as brass, copper or aluminum. An embodiment of housing 114 which may be used in conjunction with accelerometer 100 is shown in further detail in FIG. 2. In at least some embodiments, housing 114 may be omitted or reconfigured with other cross-sectional shapes, such as rectangles, triangles, etc. End plate 110 may be fixedly attached to housing 114. In embodiments of housing 114 formed from a metal, attachment of end plate 110 to housing 114 may be by soldering. Alternatively, attachment may be effected by an adhesive. Housing 114 may be closed by cap 116 which may be received in opening 113B. Cap 116 may be comprised of the same or different material than housing 114 and may be fixedly attached thereto by soldering (in embodiments comprised of a solderable metal) or, alternatively, by an adhesive. Note that in some embodiments of accelerometer 100, cap 116 may be omitted, for example, in deployments wherein environmental exposure of accelerometer 100, and, in particular piezoelectric sensing element 104, is not of concern.

FIG. 1B shows a perspective view of an assembled accelerometer 100 in accordance with at least some embodiments. In FIG. 1B, housing 114, external wires 112 and cap 116 are visible as in FIG. 1A. Additionally, potting 118 may be disposed in the end of housing 114 proximal to the external wires thereby sealing such end and insulating the connections between external wires 112 and end plate 110 (not shown in FIG. 1B). Potting 118 may comprise a potting compound such as HMP-85 from Chase Corporation, however, other potting compounds may also be employed.

Refer now to FIG. 1C. FIG. 1C shows a cross sectional view of accelerometer 100 along the section 1C-1C in FIG. 1B. Piezoelectric sensing element 104 may be disposed within interior volume 117 of housing 114. Potting 118 is shown in further detail and abutting end plate 110. As depicted in the illustrated embodiment of accelerometer 100, cap 116, housing 114 and potting 118 form a sealed enclosure for piezoelectric sensing element 104. Further, in an embodiment in which housing 114 comprises a metallic structure, the outside diameters or circumferences 120 of mounting plates 106 may also comprise a solderable material and circumferences 120 may be attached to an interior wall 122 of housing 114 by soldering thereto. Likewise, an outside diameter or circumference 124 of end plate 110 and a circumference 126 of cap 116 may also be attached to housing 114 by soldering.

Figure 2A:
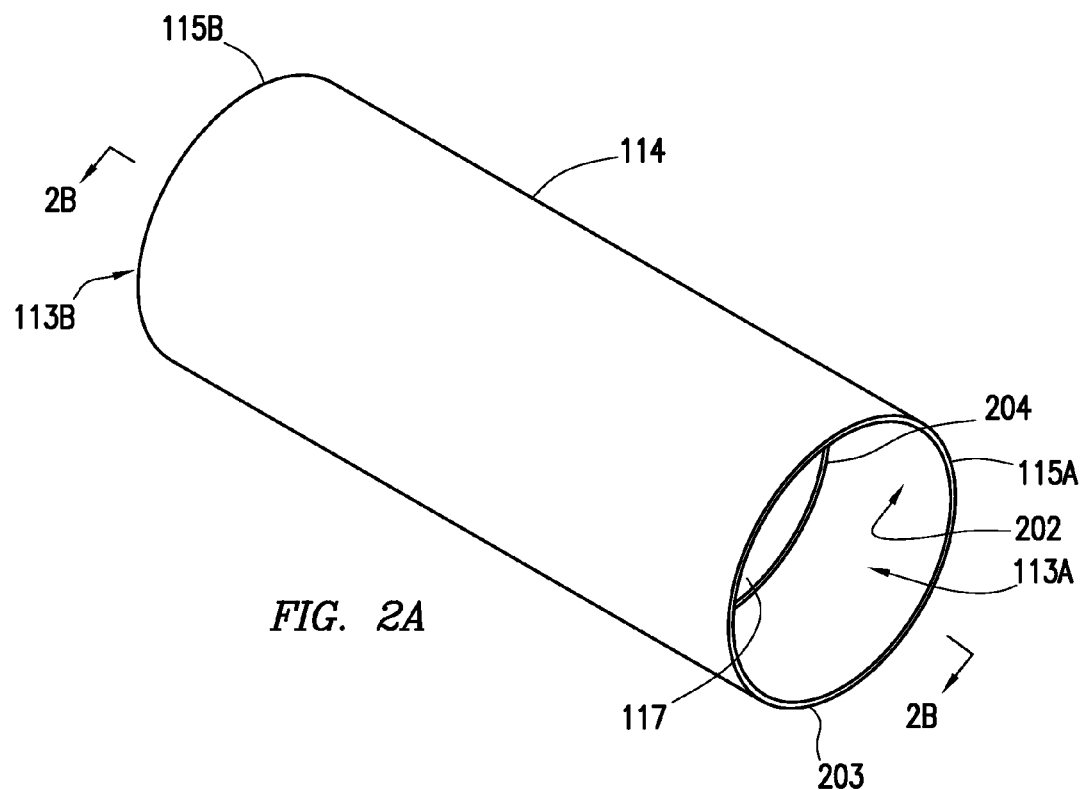
FIG. 2A shows in a perspective view, a housing in accordance with at least some embodiments.
Figure 2B:
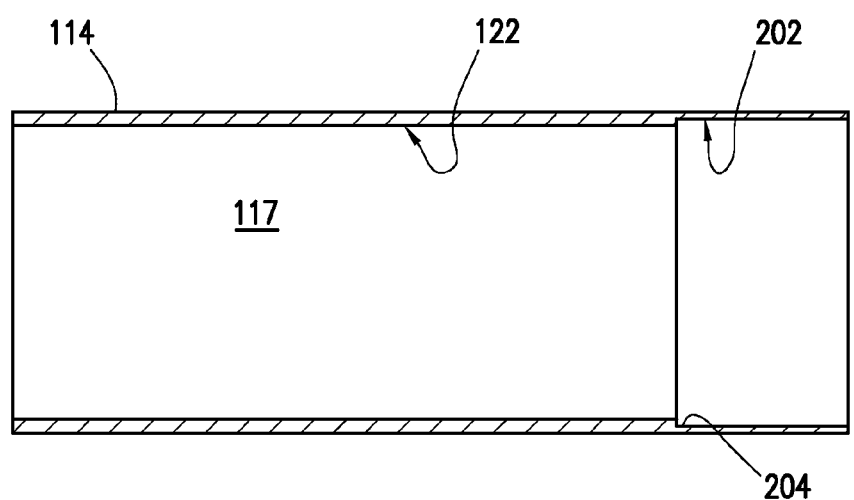
FIG. 2B shows, in a top section view, a housing in accordance with at least some embodiments.

FIG. 2 shows an embodiment of housing 114 in further detail, in two views: a perspective view, FIG. 2A and a cross-sectional view along section 2B-2B in the perspective view, FIG. 2B. The inside diameter or interior wall 122 of housing 114 bounds interior volume 117 and may include a counter bore 202 that defines an annular shoulder region 204. Openings 115A, 115B further define the extent of interior volume 117. Counter bore 202 forms shoulder region 204 where it abuts the remaining portion of interior wall 122. Shoulder region 204 may mate with circumference 124 of end plate 110 (not shown in FIG. 2) thereto as illustrated in FIG. 1C, and may be fixedly attached thereto by soldering, for example. A scribed score or similar marking such as an indentation or paint line (not shown on FIG. 2) may be provided on the exterior of housing 114 parallel to its longitudinal axis and aligned with piezoelectric sensing element 104 to facilitate orienting the accelerometer.

Figure 3A:
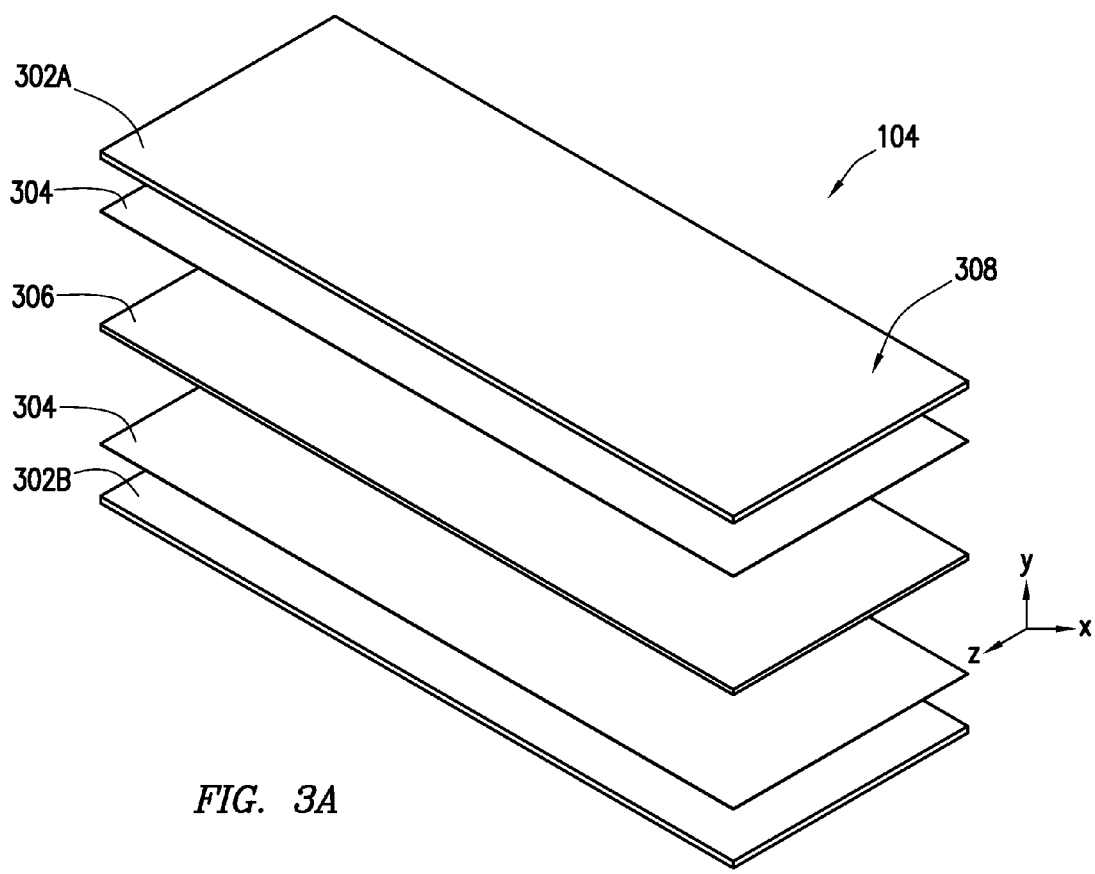
FIG. 3A shows, in a perspective view, a piezoelectric sensing element in accordance with at least some embodiments.
Figure 3B:
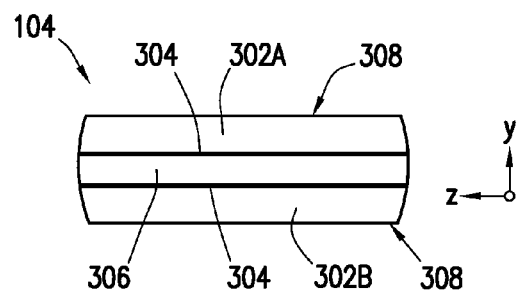
FIG. 3B shows, in a side elevation view, a piezoelectric sensing element in accordance with at least some embodiments.

Refer now to FIG. 3 showing, in perspective, FIG. 3A and end view, FIG. 3B, a piezoelectric sensing element 104 in accordance with at least some embodiments of the principles set forth herein. Piezoelectric sensing element 104 includes a pair of piezoelectric plates 302A and 302B, adhesive layers 304 disposed between piezoelectric plates 302A, 302B and conducting plate 306. In at least some embodiments, piezoelectric plates 302A and 302B may be substantially rectangular, although other geometries may also be used in alternative embodiments. Further, piezoelectric plates may be disposed having a substantially congruent relationship therebetween. Piezoelectric plates 302A and 302B may be comprised of a ceramic piezoelectric material, such as, for example, lead titanate zirconate (PZT). As would be understood by one of ordinary skill in the art with the benefit of this disclosure, piezoelectric materials exhibit an electric charge when subject to mechanical stress and, conversely, exhibit a mechanical strain when subject to an electric potential. Thus, a piezoelectric material subject to an acceleration and thereby a force in accordance with the laws of mechanics may exhibit an electric charge in response thereto. Piezoelectric plates 302A and 302B may, in at least some embodiments, be comprised of APC 850 material from APC International, Ltd., which is a PZT-based material. Other piezoelectric materials, for example, barium titanate ($BaTiO_3$), lead titanate ($PbTiO_3$), zinc oxide (ZnO), sodium potassium niobate (($K,Na)NbO_3$), bismuth ferrite ($BiFeO_3$), sodium niobate ($NaNbO_3$), bismuth titanate ($Bi_4Ti_3O_{12}$), sodium bismuth titanate ($Na_{0.5}Bi_{0.5}TiO_3$), berlinite ($AlPO_4$), barium sodium niobate ($Ba_2NaNb_5O_{15}$), lead potassium niobate ($Pb_2KNb_5O_{15}$), quartz, Rochelle salt or plastic piezoelectric materials such as polyvinylidene fluoride (PVDF) may be used in alternative embodiments of piezoelectric sensing element 104. Conducting plate 306 may be comprised of copper, brass, or other metallic material. Adhesive layers 304 may be comprised of an epoxy adhesive. An exemplary epoxy adhesive which may be used in an embodiment of piezoelectric sensing element 104 is LOC-TITE® E-30CL epoxy structural adhesive from Henkel Corporation. Further, in alternative embodiments of piezoelectric sensing element 104, adhesive layers 304 may be omitted, and in yet other alternative embodiments, conducting plate 306 may be omitted, and in still other alternative embodiments both adhesive layers 304 and conducting plate 306 may be omitted.

Considering further piezoelectric plates 302A and 302B, piezoelectric plates 302A, 302B may have disposed on a face 308 thereof a conducting material to facilitate the attachment of mounting plates 106 as described in conjunction with FIG. 1 above. For example, faces 308 may comprise silvered surfaces. In some embodiments, faces 308 may comprise other metals, for example electroless nickel, or gold. Further still, piezoelectric plates 302A and 302B may be polarized. For example, in an embodiment, piezoelectric plates 302A and 302B may have an electric polarization, P, in a direction substantially perpendicular to faces 308, shown as the y-direction in FIG. 3. In at least some embodiments, piezoelectric plates 302A and 302B may be arranged such that the respective polarizations, P, are oppositely directed, whereby for example, in piezoelectric plate 302A, P may be substantially directed in the positive y-direction, and in piezoelectric plate 302B, P may be substantially directed in the negative-y direction. Such a disposition of plates 302A and 302B may be referred to as a series mode operation. Series mode operation will be described further below in conjunction with FIG. 7. Although the illustrated embodiment of piezoelectric sensing element 104 employs two piezoelectric plates, piezoelectric sensing element 104, in at least some embodiments, may be comprised of a single plate, wherein faces 308 comprise opposite faces of the single plate.

Figure 4A:
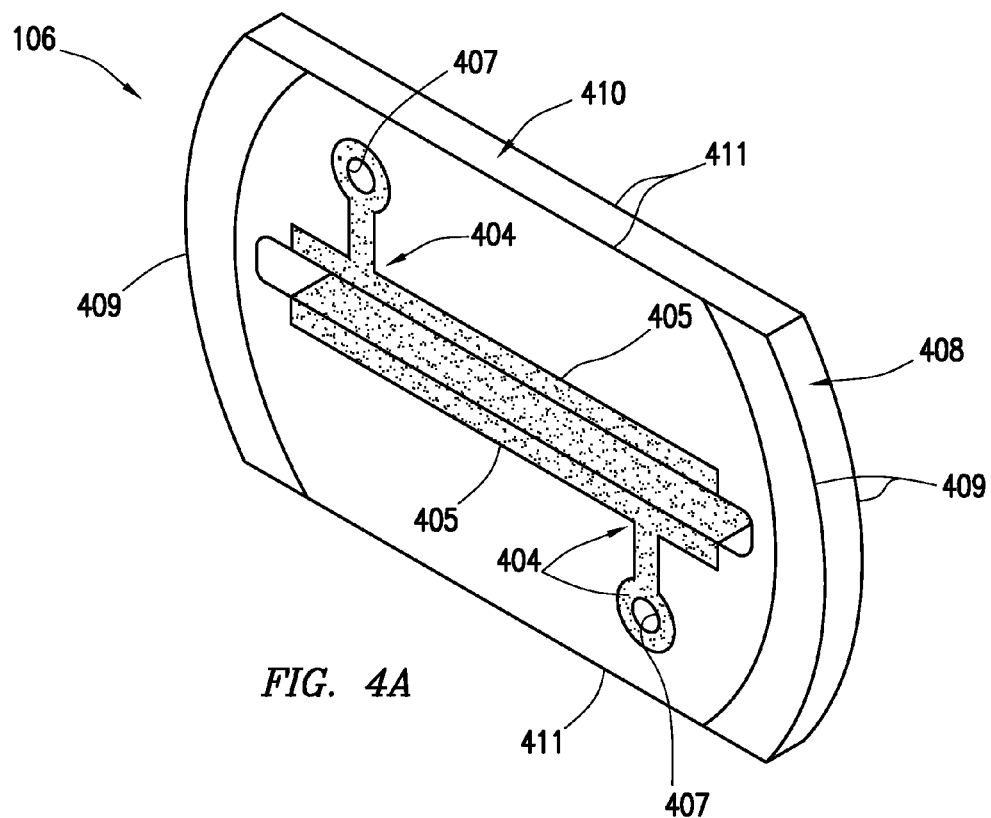
FIG. 4A shows, in a perspective view, a mounting plate in accordance with at least some embodiments.
Figure 4B:
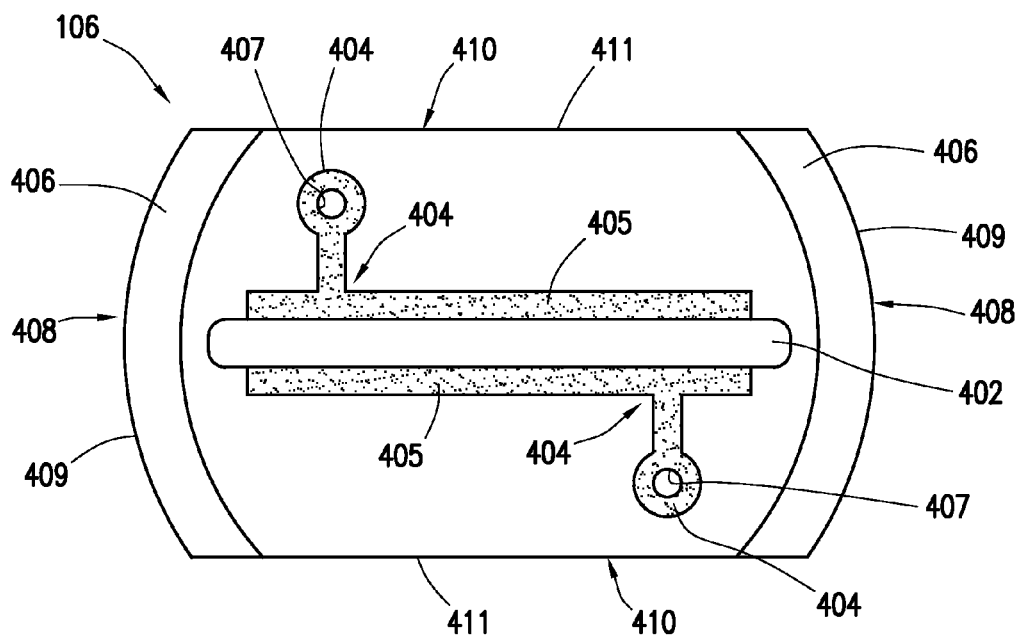
FIG. 4B shows, in a front elevation view, a mounting plate in accordance with at least some embodiments.

Refer now to FIG. 4 showing in further detail an exemplary mounting plate 106 which may be used in conjunction with an embodiment of accelerometer 100. FIG. 4 depicts mounting plate 106 in perspective, FIG. 4A, and front elevation view, FIG. 4B. Mounting plate 106 includes a slot 402 configured to receive piezoelectric sensing element 104 as described above in conjunction with FIGS. 1A-C, and conducting traces 404 which may serve to solderably attach to piezoelectric sensing element 104 via a portion 405 abutting slot 402. Thus, for example, a joint may be formed between portion 405 and a silvered face 308 of piezoelectric element 104 by the application of a eutectic composition of paste solder at the junction of portion 405 and face 308. The paste solder may be of the type used in surface-mount construction. The joint may then be formed by application of heat at a low temperature, e.g. just sufficient to melt the paste solder, using a soldering tool with large thermal mass such that the temperature of the tool is not materially reduced by the heat lost in melting the solder. In alternative embodiments, the joint may be formed using a conducting adhesive, and in yet other embodiments, an adhesive and embedded conducting wire may be used.

Additionally, conducting traces 404 may also serve to electrically connect wires 108 to piezoelectric sensing element 104, via holes 407. Holes 407 may extend through a thickness of mounting plate 106 and may be plated through to form an electrical connection to conducting traces 404, and may be configured to receive ends of wires 108. Mounting plate 106 may further comprise conducting traces 406 disposed at an outside diameter thereof. In embodiments of housing 114 comprised of a metallic shell, conducting traces 406 may serve as solderable attachments thereto. In at least some embodiments, mounting plate 106 may be comprised of a circular disk, and further, in some embodiments, a portion of a circular disk. Thus, the periphery of mounting plate 106 may include arcuate surfaces 408, which in at least some embodiments may be defined by circular arcs 409. Surfaces 408 may abut interior wall 122 of housing 114. Additionally, in at least some embodiments, the periphery of mounting plate 106 may be additionally comprised of linear surfaces 410 which may be defined by chords 411. In at least some embodiments, mounting plate 106 may be fabricated of glass-reinforced epoxy laminate material, for example FR4 glass laminate printed circuit board material.

Figure 5A:
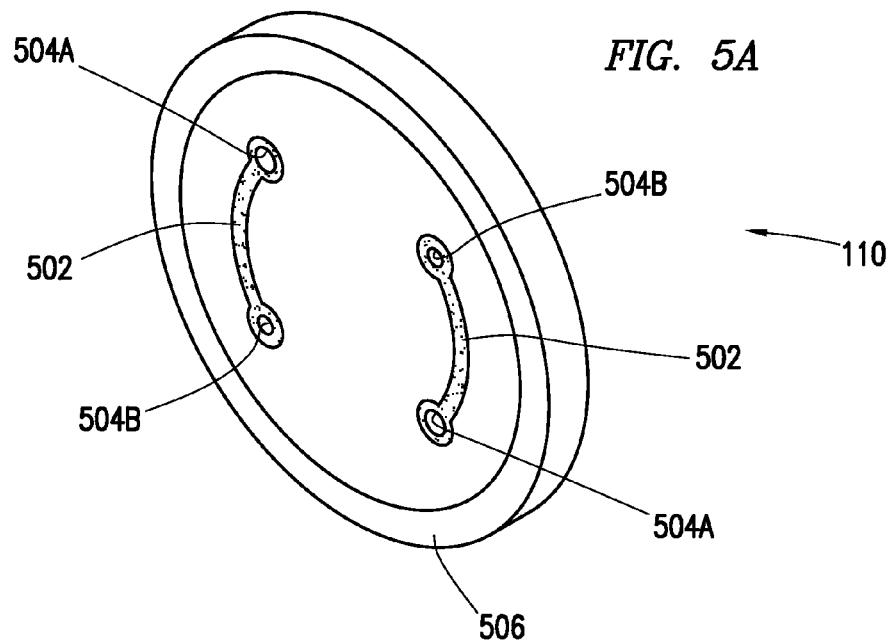
FIG. 5A shows, in a perspective view and front elevation an end plate in accordance with at least some embodiments.
Figure 5B:
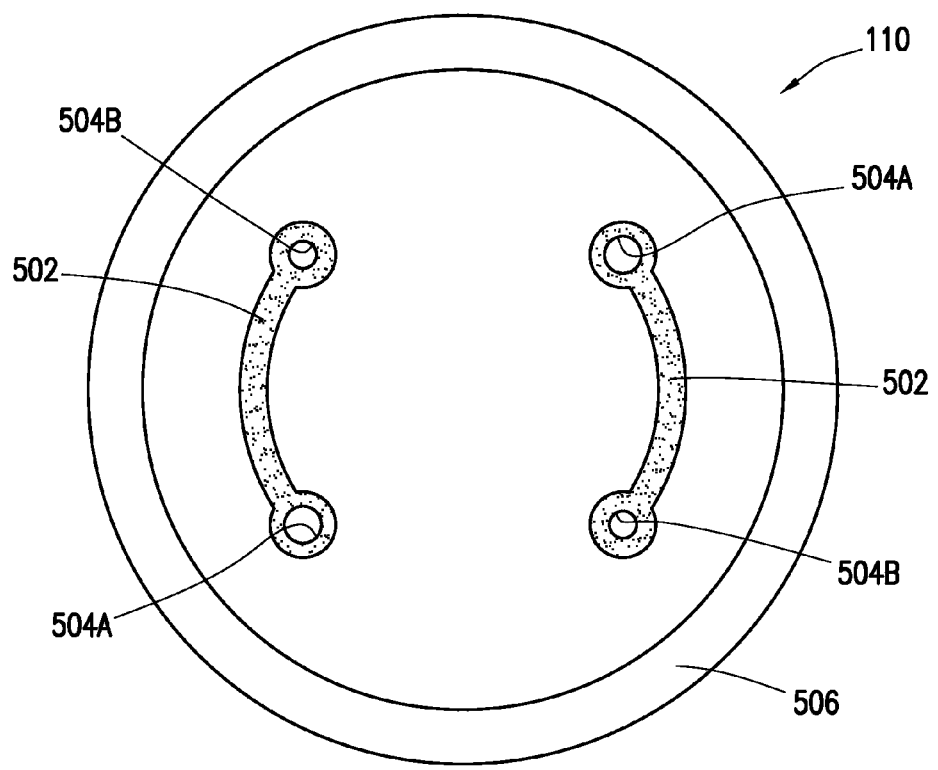
FIG. 5B shows, in a front elevation view, an end plate in accordance with at least some embodiments.

Referring now to FIG. 5, there is shown an exemplary embodiment of end plate 110 which may be used in conjunction with accelerometer 100. FIG. 5 shows a perspective, FIG. 5A, and front elevation view, FIG. 5B, of end plate 110. End plate 110 includes conductive traces 502. Holes 504A and 504B may extend through a thickness of end plate 110 and be configured to receive ends of wires 112 and 108, respectively. Holes 504A and 504B may comprise plated-through holes, and may further comprise solderable connections to wires 112 and 108. End plate 110 may also include conductive trace 506 disposed at the outside diameter of end plate 110. In embodiments of housing 114 comprised of a metallic shell, conducting trace 506 may serve as a solderable attachment thereto. In at least some embodiments, end plate 110 may have an outside diameter of about 14 mm. Further, in at least some embodiments, end plate 110 may be fabricated of a glass-reinforced epoxy laminate material, for example FR4 glass laminate printed circuit board material.

Figure 6B:
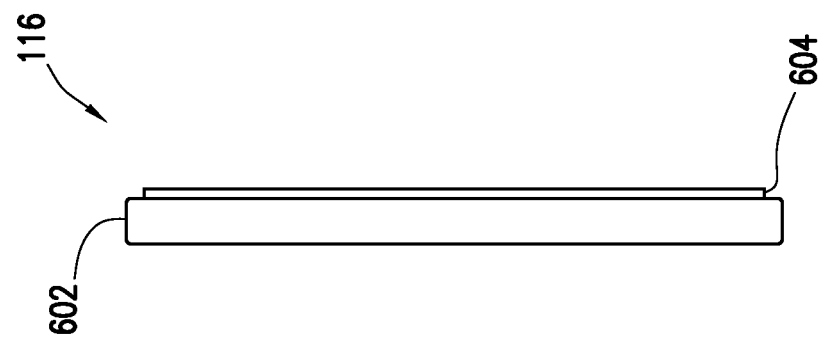
FIG. 6B shows in a side elevation view, a cap in accordance with at least some embodiments.
Figure 6A:
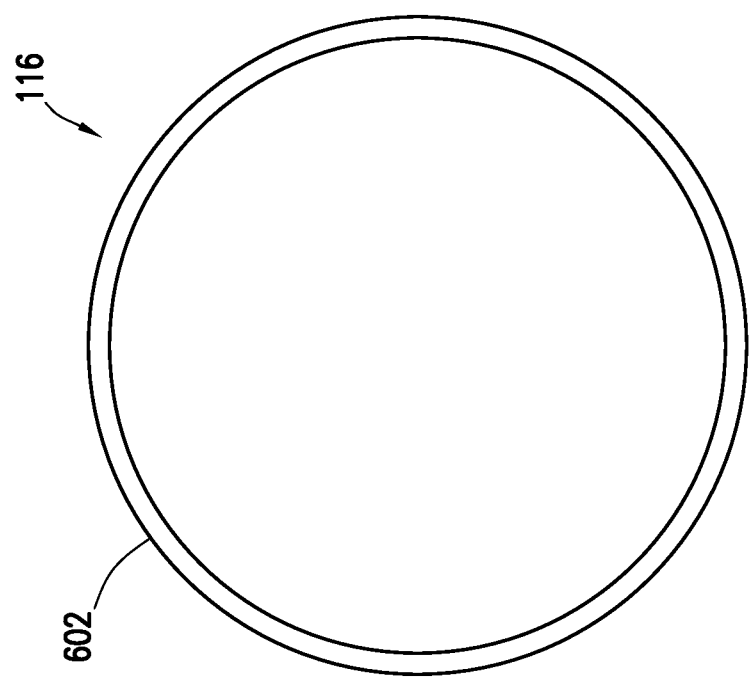
FIG. 6A shows in a front elevation view, and side elevation a cap in accordance with at least some embodiments.

FIG. 6 shows an exemplary embodiment of a cap 116 which may be used in conjunction with accelerometer 100. FIG. 6A shows a front elevation view and FIG. 6B a side elevation view of cap 116. A diameter of periphery 602 of cap 116 may have a diameter sufficient to enclose an end of housing 114. Flange portion 604 may have a diameter sized to mate with an inside diameter of housing 114. In embodiments of housing 114 comprised of a metallic shell, the diameter of flange portion 604 may be further sized to form a solderable attachment to housing 114. In other embodiments, an adhesive may be used to form the attachment. As previously discussed, in at least some embodiments of accelerometer 100, cap 116 may be omitted as, for example, in deployments of accelerometer 100 in which sealing of piezoelectric sensing element 104 from exposure to foreign matter is not an issue. In at least some embodiments, periphery 602 may have a diameter of about 14.5 mm. Further, in at least some embodiments flange portion 604 may have a diameter of about 13.6 mm. The dimensions set forth herein are exemplary and other dimensions may be used in conjunction with embodiments of accelerometer 100 deployed in various applications. Cap 116 may be comprised of a metal, and in at least some embodiments may comprise, for example, brass or copper.

Figure 7:
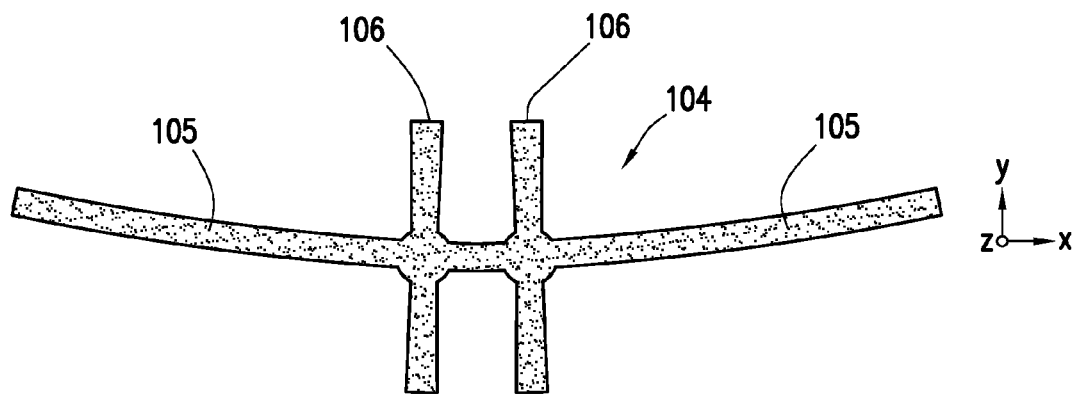
FIG. 7 shows a schematic front elevation of a piezoelectric sensing element in accordance with at least some embodiments.

To further understand the operation of an accelerometer in accordance with the principles of the disclosure refer now to FIG. 7. FIG. 7 schematically illustrates the displacement of piezoelectric sensing element 104 subject to an acceleration along the y-axis in the negative-y direction. In at least some embodiments of accelerometer 100, the y axis may be the desired axis of sensitivity, wherein the response of the accelerometer to components of an applied acceleration along, for example, axes mutually perpendicular to the y axis, is relatively small. For the purposes of illustration, the displacements are exaggerated in FIG. 7. The flexural response of piezoelectric sensing element 104 to such acceleration comprises a compression of the upper portion thereof going into compression in the x direction and the lower portion of piezoelectric sensing element 104 going into tension in the x direction. In an embodiment of piezoelectric sensing element 104 configured for series mode operation, the opposite polarization of piezoelectric plates 302A and 302B, the complementary stresses can produce a net charge displacement which manifests itself as an output voltage signal proportional to the y component of the displacement of cantilever portions 105. In conjunction with its own mass, the flexural spring constant of piezoelectric sensing element 104 forms a "spring-mass system." As such, it may exhibit a resonant frequency in the flexural mode. At frequencies below such resonant frequency, the lateral stresses in the x-direction resulting from flexure of piezoelectric sensing element 304 may be proportional to the component of acceleration along the y axis. In an embodiment including two piezoelectric plates 302A, 302B comprising APC 850 each having exemplary dimensions of about 27 mm length (x-axis), by about 10 mm width (z-axis) and 0.25 mm thickness (z-axis) and a conducting plate 306 comprised of brass disposed therebetween and having a thickness of 0.2 mm, the flexural mode resonant frequency may be about 2.3 kHz. Considering an embodiment deployed in a marine environment, such a resonant frequency is above the band of frequencies generated by seismic sources. The resonant frequency may be adjusted by, for example, the attachment of weights to cantilever portions 105 of piezoelectric sensing element 104. The dimensions set forth herein are exemplary and other dimensions may be used in conjunction with embodiments of accelerometer 100 deployed in various applications.

Figure 8:
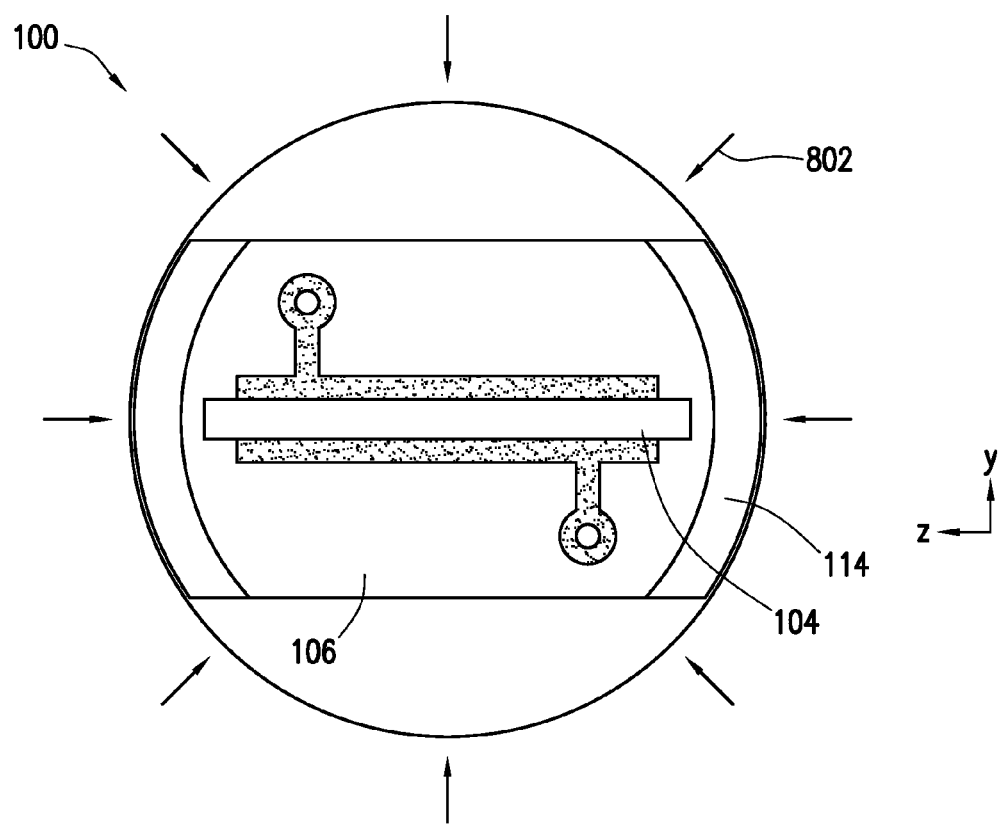
FIG. 8 shows a transverse section view of an accelerometer in accordance with at least some embodiments.

Considering further a marine environment, accelerations induced by the seismic signal fluid particle motion are generated by an acoustic pressure wave. As would be understood by one of ordinary skill in the art with the benefit of this disclosure, the magnitude of the pressure wave relative to the magnitude of the acceleration of the fluid particle is inversely proportional to the frequency of the pressure wave. Generally, pressure is a scalar and acts isotropically over the surface of housing 114. FIG. 8 shows a simplified transverse section through accelerometer 100 to illustrate the action of a pressure wave thereon. The pressure acting on accelerometer 100 is depicted by arrows 802. The pressure is supported in part by the hoop stiffness of housing 114. A slight decrease in the circumference of housing 114 may result therefrom producing stress in the y and z directions in piezoelectric sensing element 104. The electrical output of piezoelectric sensing element 104 may be a function of the amount of stress and its direction relative to the axis of polarization of the piezoelectric material comprising sensing element 104. As discussed above, in at least some embodiments, the polarization may be along the y axis. In such embodiments, a compressive stress along the z axis will produce a positive displacement of charge and a compressive stress along the y axis will produce a negative displacement of charge. However, because of the orthotropic nature of piezoelectric material, these counter-polarized displaced charges may not have the same amplitude and therefore may not cancel (algebraically sum to zero). In at least some embodiments, mounting plate 106 may, as described above in conjunction with FIG. 4, have a perimeter comprising circular arcs 409 and chords 411. The stress distribution in the y-z plane may thereby be modified such that the ratio of the pressure-induced stresses in the y and z directions are scaled wherein the charges respectively displaced are both opposite in sign and substantially equal in magnitude. Consequently, in such embodiments, the counter-polarized charges may substantially cancel, and in such embodiments, the acoustic pressure sensitivity may be substantially reduced. Additionally, by way of example, considering the y axis to be the desired axis of sensitivity, the sensitivity of accelerometer 100 to rotations about the y axis may be further reduced in embodiments of accelerometer 100 comprising a pair of mounting plates 106. Such an exemplary embodiment has been described above in conjunction with FIG. 1. As described in conjunction with FIG. 7, flexural deflections of cantilever portions 105 may generate piezoelectric charge displacements to further provide an output signal from sensing element 104. It is further noted that a rotation of piezoelectric sensing element 104 about the z axis, which may be induced by a rotation of accelerometer 100, may produce an out-of-phase flexure of cantilever portions 105, that is, a flexure in which the displacements of the cantilever portions are oppositely directed (not shown in FIG. 7). The resulting stresses may comprise a compressive stress in one of the cantilever portions 105 and a tensile stress in the other. The piezoelectric charge displacements may then be of opposite sign and may substantially cancel, thereby rendering accelerometer 100 substantially insensitive to such rotations about the z axis.

Figure 9:
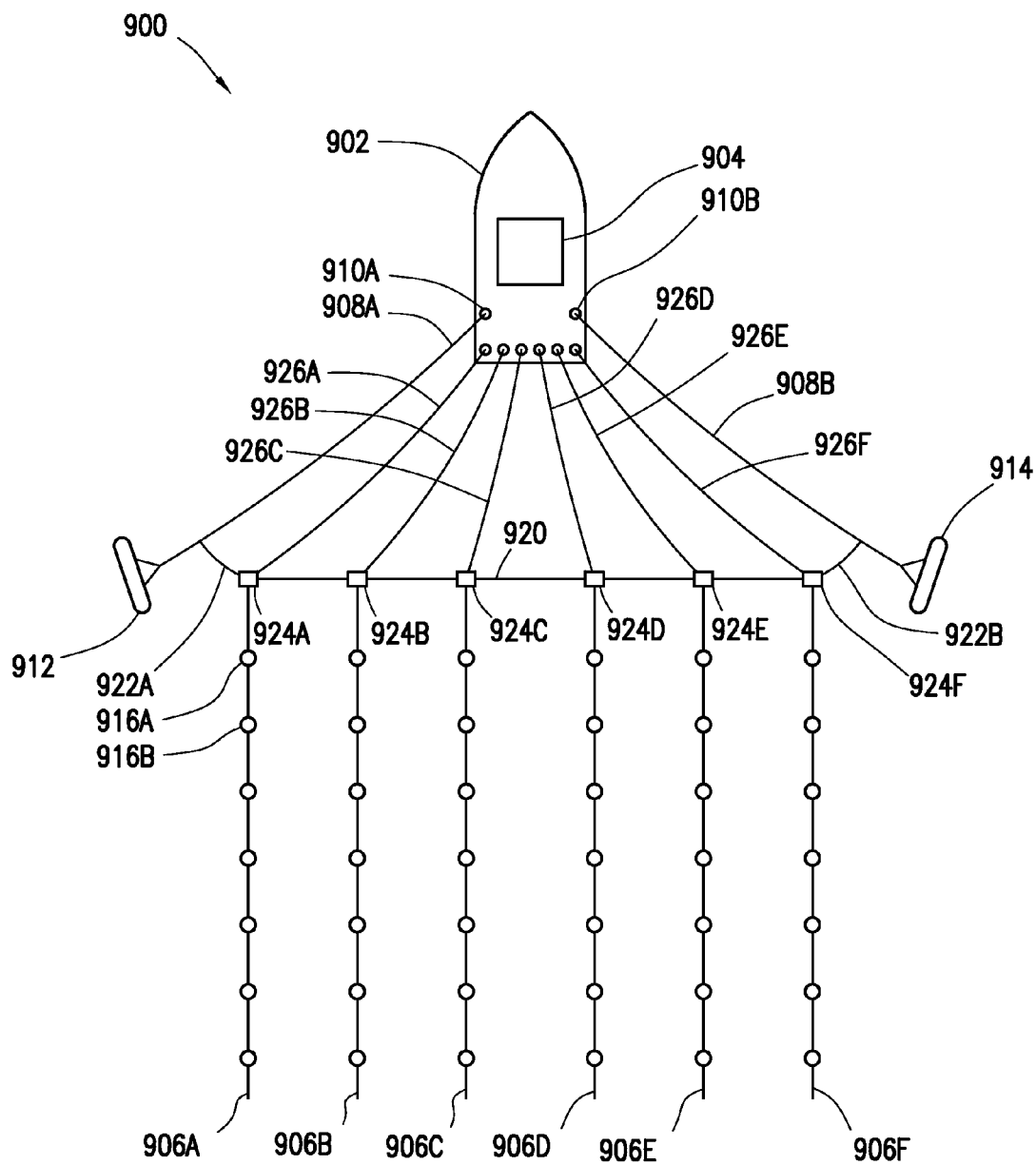
FIG. 9 shows an overhead view of a marine survey system in accordance with at least some embodiments.

Still considering a marine environment deployment, FIG. 9 shows an overhead view of a marine survey system 900 in accordance with at least some embodiments. In particular, FIG. 9 shows a survey vessel 902 having onboard equipment 904, such as navigation, energy source control, and data recording equipment. Survey vessel 902 is configured to tow one or more streamers 906A-F through the water. While FIG. 9 illustratively shows six streamers 906, any number of streamers 906 may be used. The discussion continues with respect to streamers 906 being sensor streamers, but streamers 906 are illustrative of any towed geophysical survey cable, such as transmitter cables and source cables.

The sensor streamers 906 are coupled to towing equipment that maintains the streamers 906 at selected depth and lateral positions with respect to each other and with respect to the survey vessel 902. The towing equipment may comprise two paravane tow lines 908A and 908B each coupled to the vessel 902 by way of winches 910A and 910B, respectively. The winches enable changing the deployed length of each paravane tow line 908. The second end of paravane tow line 908A is coupled to a paravane 912, and the second end of paravane tow line 908B is coupled to paravane 914. In each case, the tow lines 908A and 908B couple to their respective paravanes through respective sets of lines called a "bridle". The paravanes 912 and 914 are each configured to provide a lateral force component to the various elements of the survey system when the paravanes are towed in the water. The combined lateral forces of the paravanes 912 and 914 separate the paravanes from each other until the paravanes put one or more spreader lines 920, coupled between the paravanes 912 and 914, into tension. The paravanes 912 and 914 either couple directly to the spreader line 920, or as illustrated couple to the spreader line by way of spur lines 922A and 922B.

The sensor streamers 906 are each coupled, at the ends nearest the vessel 902 (i.e., the proximal ends) to a respective lead-in cable termination 924A-F. The lead-in cable terminations 924 are coupled to or are associated with the spreader lines 920 so as to control the lateral positions of the streamers 906 with respect to each other and with respect to the vessel 902. Electrical and/or optical connections between the appropriate components in the recording system 904 and the sensors (e.g., 916A, 916B) in the streamers 906 may be made using inner lead-in cables 926A-F. Much like the tow lines 908 associated with respective winches 910, each of the lead-in cables 926 may be deployed by a respective winch or similar spooling device such that the deployed length of each lead-in cable 926 can be changed.

Sensors 916A, 916B may include one or more instruments to detect seismic signals which may be generated by a source, such as an air gun or marine vibrator (not shown in FIG. 9) and reflected by the sea floor and the geologic formations lying beneath. Such instruments may include an accelerometer 100 in accordance with at least some of the embodiments described herein sensitive to accelerations of the fluid particles induced by the acoustic seismic signal. In some embodiments, such instruments may also include a hydrophone sensitive to acoustic pressure fluctuations comprising the seismic signal. The component of velocity of such fluid particles along the axis of sensitivity of accelerometer 100 may be obtained by time integration of the output signals of the accelerometer. By suitably combining such velocity data with the output from the hydrophone, artifacts in the seismic signal from, for example, reflections of the signal from the sea surface may be substantially reduced.

Figure 10:
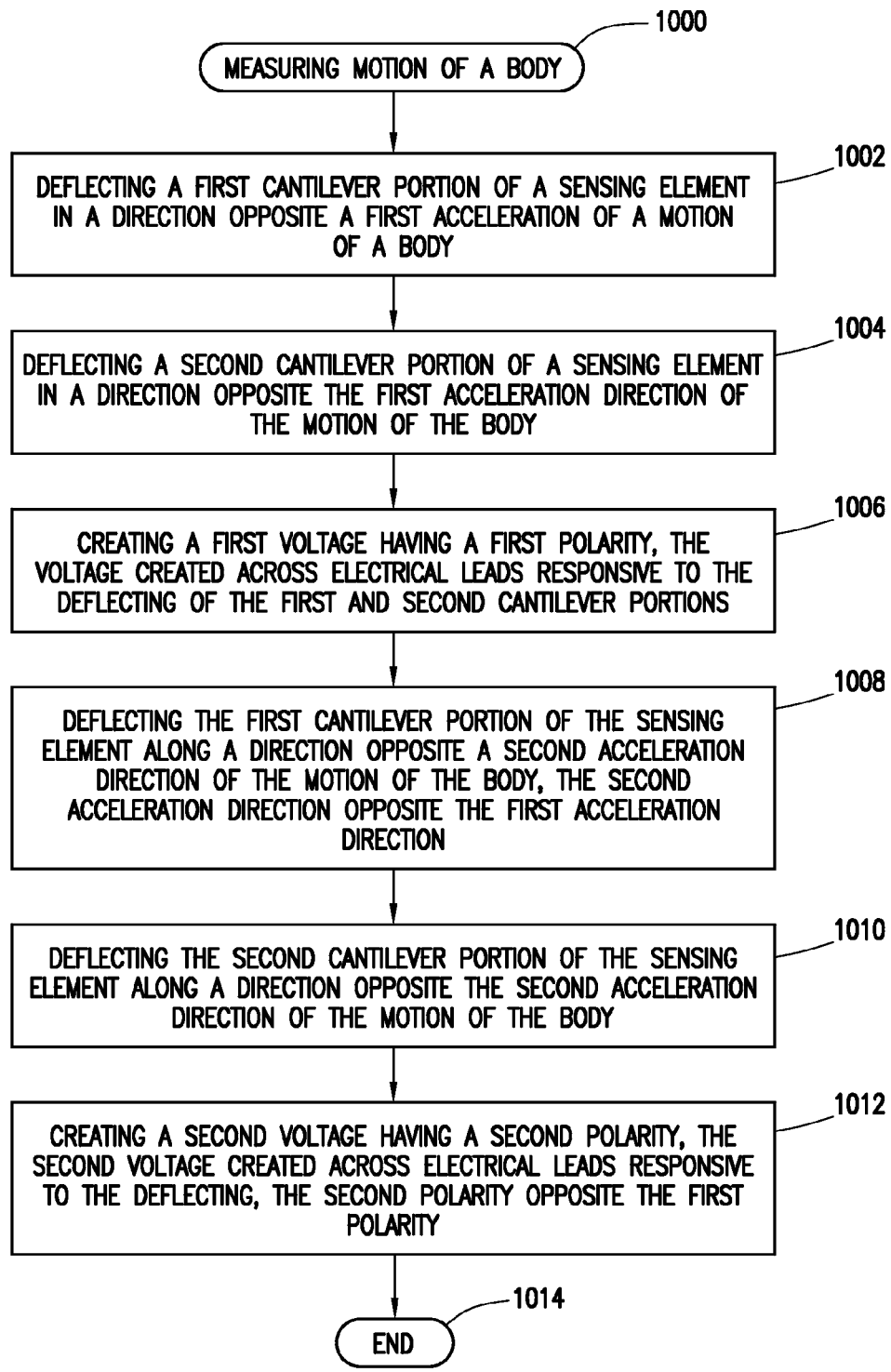
FIG. 10 shows a flow diagram of a method in accordance with at least some embodiments.

FIG. 10 shows a flow chart of a method 1000 for measuring a motion of a body. In block 1002 a first cantilever portion of a sensing element is deflected in a direction opposite a first acceleration direction of the body. A second cantilever portion of the sensing element is deflected in the direction opposite the first acceleration direction of the body in block 1004. In block 1006 a first voltage is created having a first polarity, the first voltage being created across electrical leads in response to the deflecting of the cantilever portions. The first cantilever portion is deflected along a direction opposite a second acceleration direction of the body in block 1008, the second acceleration direction being opposite the first acceleration direction. In block 1010 the second cantilever portion is deflected along a direction opposite the second acceleration direction of the body, and in block 1012 a second voltage is created having a second polarity, the second polarity opposite the first polarity, the second voltage being created across leads responsive to the deflecting of the cantilever portions. Method 1000 ends at block 1014. It is noted that although the flow chart depicts the blocks of the method in serial fashion, some operations may be executed substantially simultaneously, and the serial depiction does not indicate that the described operations are necessarily to occur sequentially in time.

In accordance with an embodiment, a geophysical data product indicative of certain properties of the subsurface rock may be produced from the measuring motion of the body. The geophysical data product may include processed seismic or electromagnetic geophysical data and may be stored on a non-transitory, tangible computer-readable medium. The geophysical data product may be produced offshore (i.e. by equipment on a vessel) or onshore (i.e. at a facility on land) either within the United States or in another country. If the geophysical data product is produced offshore or in another country, it may be imported onshore to a facility in the United States. Once onshore in the United States, geophysical analysis, possibly including further data processing, may be performed on the data product.

References to "one embodiment," "an embodiment," "a particular embodiment," and "some embodiments" indicate that a particular element or characteristic is included in at least one embodiment of the invention. Although the phrases "in one embodiment," "an embodiment," "a particular embodiment," and "some embodiments" may appear in various places, these do not necessarily refer to the same embodiment.

The above discussion is meant to be illustrative of the principles and various embodiments of the present invention. Numerous variations and modifications will become apparent to those skilled in the art once the above disclosure is fully appreciated. For example, multiple accelerometers 100 may be deployed in embodiments in which the respective sensitivity axes are individually oriented to resolve different components of the applied acceleration. It is intended that the following claims be interpreted to embrace all such variations and modifications.

What is claimed is:

1. An accelerometer comprising:
a first piezoelectric element having a first polarization, the first piezoelectric element defines an upper surface;
a second piezoelectric element having a second polarization, the second piezoelectric element defines a lower surface parallel to the upper surface of the first piezoelectric element, and the first polarization aligned with the second polarization;
a first mounting plate that defines a first aperture;
the first and second piezoelectric elements extending through the first aperture such that the first mounting plate transects the first and second piezoelectric elements, the piezoelectric elements define a first cantilever portion on a first side of the first mounting plate, and the piezoelectric elements define a second cantilever portion on a second side of the first mounting plate opposite the first side;

wherein the first mounting plate defines a periphery comprising:
a first arcuate curve portion;
a second arcuate curve portion disposed on opposite first arcuate curve portion;
a first chord connecting a first end of the first arcuate curve portion with a first end of the second arcuate curve portion; and
a second chord connecting a second end of the first arcuate curve portion with a second end of the second arcuate curve portion.

2. The accelerometer of claim 1 further comprising:
a second mounting plate that defines a second aperture, the second mounting plate spaced apart from the first mounting plate, and the second mounting plate parallel to the first mounting plate;
wherein the first and second piezoelectric elements extend through the second aperture such that the second mounting plate transects the first and second piezoelectric elements; and
wherein the first cantilever portion is disposed distally to the first mounting plate and the second cantilever portion is disposed distally to the second mounting plate.

3. The accelerometer of claim 1 wherein the first mounting plate comprises a metallic member disposed abutting the first piezoelectric element, the first piezoelectric element bonded to the metallic member.

4. The accelerometer of claim 3 wherein the metallic member and the first piezoelectric member are bonded by soldering the metallic member and a metallized layer on the upper surface of the first piezoelectric element.

5. The accelerometer of claim 1 wherein the first and second piezoelectric elements are comprised of piezoelectric materials selected from the group consisting of:
lead zirconate titanate (PZT);
barium titanate;
bismuth titanate;
lead titanate;
berlinite; and
polyvinylidene fluoride (PVDF).

6. The accelerometer of claim 1 wherein the first mounting plate has a substrate of non-conductive material.

7. The accelerometer of claim 1 wherein the second polarization has a sign opposite a sign of the first polarization.

8. The accelerometer of claim 7 further comprising the accelerometer configured to produce an electrical signal in response to an acceleration component in a direction of sensitivity perpendicular to the upper surface, and the accelerometer configured to produce substantially no electrical signal in response to an acceleration component orthogonal to the direction of sensitivity.

9. The accelerometer of claim 1 further comprising the accelerometer configured to produce an electrical signal in response to an acceleration component in a direction of sensitivity perpendicular to the upper surface, and the accelerometer is configured to produce substantially no electrical signal in response to pressure acting on the accelerometer.

10. The accelerometer of claim 1 further comprising:
a metallic member comprising a sheet of conductive material, a surface of the metallic member defines a first rectangle;
the first piezoelectric element coupled to a first side of the metallic member;
the second piezoelectric element coupled to a second side of the metallic member, the second side opposite the first side;
wherein the upper surface of the first piezoelectric element defines a second rectangle congruent to the first rectangle; and
wherein the lower surface of the second piezoelectric element defines a third rectangle congruent to the first rectangle.

11. The accelerometer of claim 10 further comprising:
a second mounting plate that defines a second aperture, the second mounting plate spaced apart from the first mounting plate, and the second mounting plate parallel to the first mounting plate;
wherein the first and second piezoelectric elements extend through the second aperture such that the second mounting plate transects the first and second piezoelectric elements;
wherein the first cantilever portion is disposed distally to the first mounting plate and the second cantilever portion is disposed distally to the second mounting plate; and
wherein the first and second mounting plates are constructed of a substrate of non-conductive material.

12. The accelerometer of claim 11 further comprising:
a housing that defines a first end, a second end opposite the first end, an interior volume, and a circular cross-section;
a cap coupled to and occluding the first end of the housing;
the mounting plates, piezoelectric elements, and metallic member disposed within the interior volume;
an end cap coupled to and partially occluding the second end;
a first electrical lead that extends through the end cap, the first electrical lead electrically coupled to the first piezoelectric element; and
a second electrical lead that extends through the end cap, the second electrical lead electrically coupled to the second piezoelectric element.

13. The accelerometer of claim 1 wherein the first and second arcuate curve portions and the first and second chords are configured to modify a pressure-induced stress distribution in the piezoelectric sensing elements, and wherein, responsive to the modified pressure-induced stress distribution, a sensitivity of the accelerometer to acoustic pressure is reduced.

14. The accelerometer of claim 13 wherein the sensitivity of the accelerometer is reduced responsive to polarization charges of the piezoelectric sensing elements having opposite sign and substantially equal magnitude.

* * * * *